United States Patent
Moeller et al.

(10) Patent No.: US 9,416,557 B2
(45) Date of Patent: Aug. 16, 2016

(54) TRANSPORT OF A TOWER OF A WIND TURBINE

(71) Applicant: SIEMENS AKTIENGESELLSCHAFT, München (DE)

(72) Inventors: Jesper Moeller, Brande (DK); Kenneth Helligsoe Svinth, Aarhus C (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/326,541

(22) Filed: Jul. 9, 2014

(65) Prior Publication Data

US 2015/0082743 A1  Mar. 26, 2015

(30) Foreign Application Priority Data

Sep. 20, 2013  (EP) .................................... 13185348

(51) Int. Cl.
*E04C 3/00* (2006.01)
*E04H 12/28* (2006.01)
*E04H 12/34* (2006.01)
(Continued)

(52) U.S. Cl.
CPC .............. *E04H 12/28* (2013.01); *E04H 12/00* (2013.01); *E04H 12/344* (2013.01); *F03D 1/005* (2013.01); *F05B 2240/122* (2013.01); *Y02E 10/72* (2013.01)

(58) Field of Classification Search
CPC ............ E02B 17/0017; E02B 17/0026; E02B 17/003; F15D 1/10; F15D 1/12; F15D 1/005; F15D 1/003; F16L 1/123; Y02E 10/727; F03D 11/04; F03D 1/001; F05B 2230/60; F05B 2240/95; F05B 2240/913; F05B 2240/122; E04H 12/085; E04H 12/00; E04H 12/342
USPC ........... 52/745.17, 745.2, 651.01, 651.07, 84; 405/211, 216
See application file for complete search history.

(56) References Cited

U.S. PATENT DOCUMENTS

| 3,076,533 | A |   | 2/1963 | Scruton |
| 5,214,244 | A | * | 5/1993 | Cummings ............ H01B 7/145 114/243 |
| 5,275,120 | A | * | 1/1994 | Ruffa et al. ................... 114/243 |

(Continued)

FOREIGN PATENT DOCUMENTS

| DE | 202010002845 U1 | 7/2010 |
| EP | 1881195 A1 | 1/2008 |
| EP | 2402278 B1 | 11/2012 |

OTHER PUBLICATIONS

Blevins, R.D.: "Reduction of Vortex-Induced Vibration." Malabar 2001 2nd edition, in particular in Chapter 3.6, 3 pages.

(Continued)

*Primary Examiner* — Brian Glessner
*Assistant Examiner* — Gisele Ford
(74) *Attorney, Agent, or Firm* — Schmeiser, Olsen & Watts, LLP

(57) ABSTRACT

The disclosed concerns a method of transporting a tower of a wind turbine in an upright position to an assembly site of the wind turbine, whereby the tower is equipped with a strake set comprising a number of strakes positioned to lead from a top of the tower in the upright position down towards a bottom of the tower, at least one of the strakes being realized as a detachable strake. The invention also concerns a strake set and transport assembly.

4 Claims, 11 Drawing Sheets

(51) Int. Cl.
*E04H 12/00* (2006.01)
*F03D 1/00* (2006.01)

(56) References Cited

U.S. PATENT DOCUMENTS

| | | | | |
|---|---|---|---|---|
| 6,019,549 | A * | 2/2000 | Blair et al. | 405/216 |
| 6,347,911 | B1 * | 2/2002 | Blair et al. | 405/216 |
| 6,561,734 | B1 * | 5/2003 | Allen et al. | 405/216 |
| 6,565,287 | B2 * | 5/2003 | McMillan et al. | 405/211.1 |
| 6,695,540 | B1 * | 2/2004 | Taquino | 405/216 |
| 6,896,447 | B1 * | 5/2005 | Taquino | 405/216 |
| 6,953,308 | B1 * | 10/2005 | Horton | 405/211 |
| 7,578,038 | B2 * | 8/2009 | McMillan et al. | 29/428 |
| 7,624,544 | B2 * | 12/2009 | Llorente Gonzalez | 52/84 |
| 8,256,993 | B2 * | 9/2012 | Branchut et al. | 405/224.2 |
| 8,443,896 | B2 * | 5/2013 | Howard et al. | 166/345 |
| 8,770,894 | B1 * | 7/2014 | Allen et al. | 405/211.1 |
| 2003/0007839 | A1 * | 1/2003 | Brown | 405/211 |
| 2005/0201832 | A1 * | 9/2005 | Edfeldt | 405/159 |
| 2005/0286979 | A1 * | 12/2005 | Watchorn | 405/224 |
| 2006/0054073 | A1 * | 3/2006 | Muehlner | 114/243 |
| 2006/0067793 | A1 * | 3/2006 | Murray | 405/205 |
| 2006/0088386 | A1 * | 4/2006 | Ellis | 405/211.1 |
| 2006/0153642 | A1 * | 7/2006 | Esselbrugge et al. | 405/216 |
| 2006/0244267 | A1 * | 11/2006 | Fraenkel | 290/54 |
| 2007/0196181 | A1 * | 8/2007 | Tyrer et al. | 405/224.2 |
| 2007/0231077 | A1 * | 10/2007 | Burgess | 405/216 |
| 2008/0050181 | A1 * | 2/2008 | Masters et al. | 405/211 |
| 2008/0131210 | A1 * | 6/2008 | Wajnikonis | 405/211 |
| 2008/0236469 | A1 * | 10/2008 | Masters et al. | 114/243 |
| 2009/0185867 | A1 * | 7/2009 | Masters et al. | 405/216 |
| 2009/0185868 | A1 * | 7/2009 | Masters et al. | 405/216 |
| 2010/0215440 | A1 * | 8/2010 | Wajnikonis | 405/211 |
| 2011/0044764 | A1 * | 2/2011 | Leverette et al. | 405/216 |
| 2011/0239584 | A1 * | 10/2011 | Tuong et al. | 52/745.17 |
| 2011/0280667 | A1 * | 11/2011 | Branchut et al. | 405/224.2 |
| 2011/0314750 | A1 * | 12/2011 | Nies | 52/173.1 |
| 2011/0318159 | A1 | 12/2011 | Krogh et al. | |
| 2012/0291687 | A1 * | 11/2012 | Dehne et al. | 114/271 |
| 2013/0330131 | A1 * | 12/2013 | Meijer | 405/184.2 |
| 2014/0007523 | A1 * | 1/2014 | Fairbairn et al. | 52/84 |
| 2014/0044488 | A1 * | 2/2014 | Critsinelis et al. | 405/172 |
| 2014/0334938 | A1 * | 11/2014 | Riddell et al. | 416/236 R |

OTHER PUBLICATIONS

Extended European Search Report for EP Application No. 13185348.3, mailed Apr. 2, 2014.

* cited by examiner

TRANSPORT OF A TOWER OF A WIND TURBINE

CROSS-REFERENCE TO RELATED APPLICATIONS

This application claims priority to EP Application No. 13185348.3, having a filing date of Sep. 20, 2013, the entire contents of which are hereby incorporated by reference.

FIELD OF TECHNOLOGY

The following relates to a method of transporting a tower of a wind turbine in an upright position to an assembly site of the wind turbine. It also relates to a strake set of a tower of a wind turbine for transport in an upright position to an assembly site of the wind turbine and assembly system of the same.

BACKGROUND

Wind turbines comprise a tower and a nacelle placed on top of that tower, whereby the nacelle is equipped with a rotor which rotates due to the impact of wind. In the nacelle, the rotational movement of the rotor is used to generate electric power.

Large wind turbine towers often comprise a number of tower segments, e. g. made of steel, which when assembled together form the complete wind turbine tower. The assembly of large wind turbine towers—in particular under offshore conditions, but also onshore—consumes a lot of time, effort, and financial resources.

Thereby, lifting (or raising, which is used as a synonym for lifting throughout this description, as well as "raising device" is used as a synonym for "lifting device") the tower in segments or as a whole to the assembly site, i.e. to a foundation on which the tower is to rest to be later equipped with the nacelle and the rotor, poses several problems. Firstly, the tower (or segments thereof) has to be firmly held by a suitable raising device. One such raising device is described in the European patent EP 2 402 278 B1. Secondly, the tower is subject to enormous vibrations induced by the wind coming from its side. Such side winds may have high velocities—as can be expected especially in areas in which wind turbines are operated.

The above-indicated vibrations are commonly called vortex induced vibrations (VIV) which can be the result of alternating vortex shedding around the tower in strong wind conditions. This shedding results in alternating pressure differences over the wind turbine tower's cross-section perpendicular to the wind direction. In case the shedding frequency is close to the natural frequency of the wind turbine tower, alternating shedding is regular and the amplitude is large enough compared to the structural damping of the tower, VIV can occur which could cause damage to the wind turbine tower or reduce its fatigue life.

VIV have been known for a long time and several measures have been found of how to reduce these vibrations on readily installed tubular structures such as high chimney stacks. An overview over such measures is given in Blevins, R. D.: "Flow-Induced Vibration". Malabar 2001 $2^{nd}$ edition, in particular in Chapter 3.6 (pp. 77ff.). One approach is to dampen the structure by increasing the weight on its top. Other approaches refer to streamline the cross-section of the structure by measures on its outer surface. An overview over these measures is given on page 78. Amongst these streamlining measures, a prominent one is that of the use of so-called helical strakes. The use of such strakes was first published by U.S. Pat. No. 3,076,533 assigned to Scruton et al.

The use of such measures on wind turbine towers however basically forbids itself because they do not only affect the tower, but indirectly the behaviour of the wind turbine itself: they influence the behaviour of the rotor blades, which means they reduce the affectivity of the wind turbine, i.e. the power output of electric power at a given wind speed.

SUMMARY

An aspect relates to a solution of how to reduce VIV during transport of a wind turbine tower whilst maintaining the power output of such wind turbine in an operational state.

Accordingly, the above-mentioned method comprises a step of equipping the tower with a strake set comprising a number of strakes positioned to lead from a top of the tower in the upright position down towards a bottom of the tower, at least one of the strakes (preferably all strakes of the strake set) being realized as a detachable strake.

A tower may comprise a complete wind turbine tower from bottom to top, whereby the bottom can be connected to a tower foundation whereas the top serves as an interface to the nacelle. This definition is preferred in the context of the invention as the assembly of a tower in one piece at an assembly site implies a lot of savings in time of effort, time and financial expenditure (in particular because a high-rise crane or other lifting device only needs to be employed for a considerably shorter timespan than during an assembly of several segments which are placed one on top of the other). However, a "tower" may also be defined in the context of the invention to comprise a tower segment, i.e. a (tubular) part of a complete tower.

As for the definition of "upright position" this refers to the position (i.e. orientation) of the tower in which it is essentially in the designated operating orientation on the assembly site. Thereby, its longitudinal extension is in an essentially vertical orientation.

Accordingly, non-stationary strakes are used instead of such strakes which are fixedly connected to (i.e. installed as a part of) the wind turbine tower. Such detachable strakes therefore comprise at least one (preferably two) releasable connection interface(s) to the wind turbine tower. Such (first) releasable connection will first be connected to the top of the tower (or essentially in that region, which may imply an attachment at the inside of a top part of the tower, an attachment right on the top end of the tower and/or an attachment at the outer surface of the tower slightly (i.e. up to 5 metres) below the top end of the tower. A second releasable connection can—which is preferred—be connected, i.e. attached to a lower part of the tower, essentially at the bottom of the tower. Such attachment essentially at the bottom of the tower is an attachment at the outer surface of the tower so that the strake is not in the way of the connection of the bottom of the tower to a foundation (or in case of a tower section to a lower tower section).

For transport, the strakes of the strake set are connected to the tower in such way that they do not fall off the tower during transport. After transport, they can be taken off the tower again to give it its desired (essentially round) cross-sectional shape.

The use of detachable strakes rather than stationary ones has a number of advantages a selection of which will be given below:

Firstly, the detachable strakes can be connected and disconnected to the tower so that they can be reused on a next tower. Detachable strakes are thus reusable strakes. This saves material and expenditure, as the strakes are only needed for transport and not for the operational state of the wind turbine (vibration damping is then for instance caused by the weight of the nacelle).

Secondly, the strakes can thus be exclusively used in those conditions in which they are needed, namely for transport.

Thirdly, the strakes can be taken off before the wind turbine starts to operate. This means that the major drawback of strakes, namely their negative impact on the power output of the wind turbine, can be completely eliminated.

As outlined by Scruton et al. (the teachings of which are incorporated in this description) the position and pitch of the strakes (i.e. their helicity) can be adjusted according to the needs of both the tower and of the ambient environment, i.e. for instance in dependence of the eigenfrequency of the tower and/or its diameter and/or on the wind speed.

The invention also concerns a strake set of a tower of a wind turbine for transport in an upright position to an assembly site of the wind turbine, the strake set comprising a number, such as a plurality of strakes, whereby at least one of the strakes (again, preferably all of the strakes) is (are) realized as (a) detachable strake(s). That means that the use of such strake set makes possible the transport method according to the invention.

Therefore, the invention also concerns the use of a strake set according to the invention for equipping a tower of a wind turbine for transport in an upright position to an assembly site of the wind turbine.

Further, the invention concerns a wind turbine tower equipped with a strake set according to the invention.

The invention also concerns a transport assembly for transporting a tower of a wind turbine in an upright position to an assembly site of the wind turbine comprising a mechanical raising device realized to be connected to the top of the tower with reference to the upright position and a strake set according to the invention. One such possible mechanical raising device has been mentioned above, another solution will be explained below in more detail. The transport assembly thus comprises the raising device and the strake set according to the invention. Thereby, during the transport of the wind turbine tower, both the raising device and the strake set are connected to the wind turbine tower, possibly also directly interconnected. That means that the strakes of the strake set, instead of being directly connected to the tower (i.e. the top of the tower) can also be indirectly connected to the top of the tower via the raising device to which they are connected.

Particularly advantageous embodiments and features of the invention are given by the dependent claims, as revealed in the following description. Features of different claim categories may be combined as appropriate to give further embodiments not described herein.

Generally, the expression "strake set" also includes a strake set comprising exactly one detachable strake. The number of (detachable) strakes of the strake set is at least two, or three. Thereby, it may be noted that two strakes have a sufficient effect in those cases in which the wind direction during transport is known so that they can be aligned along the tower such that they face the wind in an effective way. Three is the one preferred number of (detachable) strakes as this makes the wind turbine tower and the method according to the invention independent of the wind direction while at the same time an increase of the number of (detachable) strakes has no extra positive effect in terms of reduction of VIV.

The strakes of the strake set (which thus comprises a plurality of (detachable) strakes) are aligned along the circumference of the tower (in particular with reference to their connection point at the top of the tower) at essentially equal angles. Such equidistant distribution leads to an essentially equal distribution of forces onto the tower on the side at which the wind is directed, no matter where this side may be (i.e. also under changing wind directions).

It is further as suggested by Scruton et al. that the strake set is aligned along a longitudinal extension from the top of the tower down towards its bottom describing a spiral or helix. The pitch of such spiral or helix is about five times the diameter of the wind turbine tower at its top end. Variations of +/−50% of that pitch are however included in that pitch limitation. The pitch is normally adjusted when winding the strakes about the outer surface of the wind turbine tower and by fixing the lower end of the strakes to fixing points of the wind turbine tower. It may however also be varied along the overall longitudinal extension of the wind turbine tower, for instance by fixing the strakes locally at fixing points along that longitudinal extension and then varying the pitch at lengths from fixing point to fixing point.

According to a particularly an embodiment, the detachable strake comprises a rope. The expression "rope" thereby also refers to chains or the like, i.e. generally to thin suspension means with a longitudinal extension substantially larger than its cross extension. Such is the case if the longitudinal extension is at least a hundred times larger than its cross extension. The rope is essentially round (i.e. circular or elliptic) in its cross-section. Further, the rope is a flexible rope, i.e. one which can be bent (and re-bent) along its longitudinal extension also stretched to extend the longitudinal extension. When suspended at one end, the rope hangs down loose with its other end.

The strake set according to the embodiment comprises a rope which is covered at least along a substantial part of its longitudinal extension with a covering structure which is realized to substantially increase the wind resistance of the detachable strake.

Such covering structure can have several advantages over a strake which exclusively comprises a rope. Firstly, the covering protects the wind turbine tower from the rope, in particular from material damages caused by frictions between the rope and the wind turbine tower. Thus, scratches and other damages which may for instance be caused by a rope realized as a chain can be completely avoided at least all along the extension of the rope which is covered by the covering structure. Secondly, the covering structure increases the wind resistance of the strake. This makes such strake by far more effective than a strake which is solely comprised of a rope. A much greater part of the wind can be led away from the tower by means of such covering structure. In this context, the strakes (due to their covering structure) project from the outer surface of the wind turbine tower by about at least 5%, at least 10%, at least 15% of the diameter of the tower.

In this context, the rope is covered with the covering structure along at least a quarter, at least a third of a longitudinal extension of the tower beginning essentially at the top of the tower extending down towards its bottom. The wind speeds and thus also the VIV are strongest in the upper region of the tower, in particular in offshore conditions. Therefore, positioning the wind-catching covering structure in that top region is particularly effective. The inventors have found out that in fact it is not absolutely necessary to have such wind-catching covering structure in the middle and/or the lower third of the extension of the wind turbine tower. Thus, material and expenditure can be saved by equipping the strake only at its uppermost quarter or third with the covering structure.

Further, the covering structure has a cross-sectional shape with reference to the longitudinal extension of the strake which shape comprises a geometrical figure with at least three angles, preferably exactly three angles. Such triangular shape or a shape with more than three angles means that the covering structure has a cross-sectional shape with edges (realized by the angles) which leads away the wind in a particularly effective way. One side of the covering structure (between two of the above-named angles) can loosely rest on the outer surface of the wind turbine tower so that the rope does not get into direct contact with that surface. At the same time, the at least two other sides can catch the wind from either directions (i.e. the front or the back)

As for the triangular shape, this effectively prevents the (loose) strake from rolling over its edges as these edges are sharp edges. And even if such rolling over happens under very severe wind conditions, the triangular shape will normally end such rolling movement after one or two such occasions. Then the strake will rest comfortably on any one of its other sides.

The geometrical shape comprises a number of planes interconnecting the angles, which planes have essentially the same extension in the cross-section. These planes thus define the above-mentioned sides. If the planes have essentially the same extension along the cross-section, the strake is particularly easy to assemble along the wind turbine tower as any arbitrary plane can be brought into contact with the outer surface of the wind turbine tower: no plane is smaller than any other so that their contact surface with the wind turbine tower is always the same. In other words, the extension of any of the planes defines the contact surface with the wind turbine tower and thus the friction between the strake and the wind turbine tower. At the same time, it is also always guaranteed that the strake projects away from the wind turbine tower at essentially the same distance from the wind turbine tower so that the wind-catching effect and thus the prevention of VIV can be considered to be the same no matter on which plane of the strake the contact surface to the wind turbine tower is realized.

The covering structure is assembled about the rope over a mechanical reinforcement structure which reinforcement structure is realized to establish the geometrical shape. Such reinforcement structure may for instance comprise a number of longitudinal rods parallel to the principal extension of the rope. Such rods can be distanced from one another and/or from the rope itself by means of interconnecting distancing rods. Another possibility (as an alternative or as an add-on to such a rod structure) is that the covering structure is filled with a filling material such as a foam, a solid filling material, and/or a liquid filling.

It is particularly preferred that the covering structure is realized to encompass the rope. Thus, the covering structure protects the rope and the surface of the tower simultaneously along all sides of the rope along its cross-extension perpendicular to its longitudinal extension. The rope thus runs inside the covering structure and is completely shielded by the latter from the environment in that particular cross-section.

As for the material of the covering structure, that comprises a flexible film material, such as polystyrene. Such flexible film material may comprise an extruded film, a woven flat structure as well as a non-woven one. The film may be structured or unstructured. It can be reinforced (for instance by fibres or the like), but need not necessarily be. Polysterene has proven particularly advantageous as it is flexible on the one hand, but comparatively strong when it comes to tearing.

As for the material of the rope, that comprises a fibre material, such as a material of ultra high molecular weight polyethylene. Such fibre ropes are again comparatively flexible (in particular in comparison with metal chains). Ultra high molecular weight polyethylene which can for instance be purchased under the trademark name Dyneema from the Dutch company Royal DSM N.V., has particularly advantageous properties in particular referring to tearing strength and flexibility.

As has been mentioned above that the invention also concerns a transport assembly which, besides the strake set according to the invention, comprises a mechanical raising device. One example of such raising device has been mentioned in the introduction. However, a particularly new raising device should be used, which has one major advantage over the other devices given above: it can serve to hold a complete wind turbine tower, not just segments thereof. Therefore, that raising device will be described in more detail below:

Embodiment of a raising device of the transport assembly

Such embodiment refers to a raising device realized to be connected to a tower of a wind turbine which comprises a connection member to a raising machine and a plurality of holding members positioned at predefined distances from each other and orientated to be movable in radial locking directions. These locking directions are such that the holding members when moved into a locking position at a predefined engagement position of the tower engage with a counter-shape of the tower, whereby the holding members are automatically tiltable and/or shiftable into the locking position by a movement mechanism.

In this context it may be noted that the connection of the raising device to the tower is carried out at the top of such tower. Thus, if one considers the tower to be essentially tubular or cylindrical in shape, the top of such tower is that essentially round opening of the tower which is to face upwards when assembled in an upright position on the assembly site. This also implies that the tower can be raised by means of the raising device in such upright position, i.e. in the same orientation in which it is to be assembled eventually at the assembly site.

A connection member may for instance comprise a hook or an eye which can engage with a corresponding eye or hook from the raising machine. The raising machine may for instance be a crane with a wire to which the connection member can be connected.

This embodiment of a raising device makes raising of an entire tower possible because it can be built stable enough to carry the complete weight of such complete tower at one time. This would not be the case with raising methods employing brackets and wires to connect to a raising machine: several brackets would be necessary to achieve an overall enough stability of the connection of the tower to the raising device during transport. That also implies that several wires would be necessary and that each one of these wires would have to be made stable enough to carry the entire weight of the wind turbine tower due to movements of the tower in the wind. Thus, only the sufficiently stable device according to the invention provides for a solution in which an entire wind turbine tower can be raised as one piece.

The raising device comprises a plurality of holding members positioned at predefined distances from each other. These predefined distances and thus corresponding predefined positions of the holding members correspond with the position of the counter-shape of the tower to which the raising device is to be connected. That implies that, unlike in the state of the art mentioned above, the holding members are not positioned anywhere and can then be brought into a desired operating position manually or by means of a motor. Instead, the holding members are generally situated in that desired operating position and need not be moved there. In this context, an "operating position" means such position in which the holding member can be connected to (or disconnected from) the counter-shape of the tower by a pre-defined movement, namely a movement from an open position into a locking position and reverse. Thereby, the open position and the locking position of the holding member are also clearly defined and each holding member is mechanically limited in its movement so that it can only move between those two positions (i.e. between the open position and the locking position).

Corresponding to the open position and the locking position of each of the holding members is its locking direction and—reverse—its unlocking direction (i.e. the counter direction of the locking direction). Both the locking direction and unlocking direction are radial, i.e. along a straight line from the centre point of the (essentially tubular) tower to the shell of the tower in a section of the tower perpendicular to its longitudinal tubular extension. That means that the locking direction is either towards that centre point or away from it and that the unlocking direction is exactly opposite. For instance, the raising device may comprise three holding members aligned at equal distances along an outer or inner circumference of a tower to which they are to be connected. For that purpose each of the holding members can be connected at a predefined position to a holding beam at essentially one end of the holding beam whereas the other end of the holding beam is connected to the corresponding ends of the other holding beams. Therefrom results a kind of star-like structure of three holding beams.

Furthermore, the holding members are automatically tiltable and/or shiftable into their locking position by means of a movement mechanism. That implies that upon activating the movement mechanism the holding members are automatically tilted and/or shifted from the open position into the locking position or vice versa. Automatically tilting or shifting implies a purely mechanical movement rather than one induced by manual effort and/or motor power transmission and/or hydraulic/pneumatic power transmission. However, a support by a motor or a hydraulic system is principally feasible. It is particularly preferred that the movement mechanism connects the holding members to the connection member of the raising device so that a particular movement of the connection member automatically produces the tilting and/or shifting movement of the holding members unless such movement is intentionally blocked.

The term "holding member" refers to such a mechanical holding device that is movable in and/or against the locking direction. In addition, the raising device may also comprise other, non-movable members with a holding function and design which may for instance be used as a counterpart of a holding member. For instance, one such non-movable member may engage with the counter-shape of the tower at a first position, for instance by transferring the non-movable member below the counter-shape by means of form fit, i.e. by positioning the complete raising device with respect to the tower such that the non-movable member is engaged with the counter-shape. Then, in order to make sure that the raising device is stably connected to the tower, the holding members are moved into their locking positions at a second position (which functions as a counter position to the first position) so that the holding members in their locking positions together with the non-movable members provide a firm hold of the tower.

At least one holding member, and at most each holding member, comprises a claw (which can also be considered to be a gripper). Such claw can engage with the counter-shape of the tower, for instance by going partially underneath and/or around the counter-shape. For instance, the counter-shape of the tower comprises an inner or outer connection flange to another tower and/or towards the nacelle parts of the wind turbine. A claw can thus be tilted or shifted underneath the connection flange and hold it with ease.

As has been outlined before, the raising device may comprise three holding members. However, it is principally possible that it only comprises two holding members. It has been found particularly advantageous that the number of holding members is an even number and that the holding members are arranged in pairs of corresponding holding members. In this context at least two corresponding holding members are aligned along a straight line. This line is a radial line. In particular, these corresponding holding members can be realized and positioned and aligned such that their locking directions are counter directions. For instance, if the locking direction of a first holding member is towards the centre point of the tower section and the second, corresponding, holding member is positioned at the opposite side of the centre point of the tower (with respect to the first holding member) and its locking direction is also towards the centre point of the tower. Therefore, the second holding member's locking direction is the counter direction of the first holding member's locking direction. The tower is then held in between the two corresponding holding members which exert a holding force towards the inner side of the tower. In contrast, both corresponding holding members can also be orientated in the opposite locking directions, i.e. facing away from the centre point of the tower, in which case they exert a holding force towards the outside of the tower. The first such described embodiment is particularly useful if an outside flange is used as the counter-shape of the tower, whereas the second such described embodiment is particularly useful if an inside flange is used as the counter-shape of the tower.

In an embodiment with two corresponding holding members, these are connected to one common holding beam. The (straight) beam thus serves as a holding structure for the two corresponding holding members and constitutes the straight line along which the holding members are both aligned.

As for smaller and/or lighter towers, it has been found by the inventors that the use of two holding members can be sufficient, but three holding members already increase the stability of the connection between the tower and the raising device considerably. In particular, it has proven most advantageous to use four holding members because this provides for a very high stability whereas more than four holding members do not substantially add stability. In the context of four holding members, the use of corresponding (pairs of) holding members as outlined above is very advantageous: The raising device comprises (at least) two pairs of corresponding holding members.

In this context, an embodiment of the raising device is characterized by a first pair of corresponding holding members being connected to a first common holding beam and a second pair of corresponding holding members being connected to a second common holding beam. This second holding beam is realized as a cross-beam of the first holding beam, whereby the cross-beam is orientated essentially perpendicularly to the first holding beam, which makes the construction of the raising device particularly stable. This further makes possible that the raising device can be positioned such that the point where the first holding beam and the second holding beam are interconnected can essentially be positioned at the above-mentioned centre point of the tower and that from this centre point the holding members can be arranged essentially equidistantly along the (inner or outer) circumference of the tower.

This embodiment can be further enhanced by interconnecting the first holding beam and the second holding beam by a number of diagonal connections such as interconnecting beams, ropes or the like. Such diagonal (inter)connections can further stabilize the raising device so that is can carry even larger loads without the danger of getting twisted or worn.

It is possible to only temporarily position the holding members at their predefined positions, i.e. at their predefined distances from each other. That means that the predefined distance can be varied depending on the kind (and width, i.e. in the case of a round tower its diameter and radius) of the tower to be raised. The holding members are fixedly installed, i.e. permanently fixed at the predefined distance. This is in particular so if complete towers are to be raised as one by the raising device because then the same width of the tower (segment) always applies for wind turbines of the same make of wind turbine: such tower must always carry a nacelle of a particular size, which depends on the nominal power output of the wind turbine. That width currently varies between about 3000 mm and 4500 mm. More specifically, currently a 3.6 MW wind turbine of the applicant has a width of 3128 mm and a 6 MW wind turbine a width of 4145 mm. A change of position of the holding members is not necessary in case one decides to always raise towers of the same make of wind turbines so that instead a more stable, namely fixed, position of the holding members is possible.

In this context it may be noted that also the orientation of the holding members, i.e. their designated locking direction could be changed (for instance to be able to engage both with inner and outer flanges of towers), but again, in particular in the above-mentioned context of complete towers to be raised, that the holding members are fixed also with respect to their orientation.

According to an embodiment, the holding members are mechanically interconnected via the movement mechanism with the connection member via a number of hinges such that upon pulling the connection member upwards, the holding members automatically tilt and/or shift into the locking position unless blocked. This means that there is a mechanical tilting connection between the connection member and the holding members: Once the raising device has been brought into a particular position—designated for initiating the engagement of the holding members with their counter-shape(s)—the raising device only has to be pulled upwards via the connection member and automatically the holding members get into their locking positions. This highly automatized mechanism provides for a safe and very easy locking procedure which thus saves time, effort and expenditure.

As outlined before, it is advantageous if the holding members are realized, i.e. sized, mechanically designed and located, to engage with an upper (inner and/or outer) flange of the tower along its (inner and/or outer) circumference. This upper flange thus comprises (constitutes) the counter-shape for the holding members. Such flanges have proven to be stable enough to withstand all raising forces, which means they can clearly carry the complete weight even of a complete tower. Such also applies for towers of today's sizes and weights, e.g. for 90 metre high steel towers weighing about 300 tons.

For safety reasons the raising device further comprises a blocking mechanism realized to block a movement of the holding members into and/or out of the locking position. That means that once the blocking mechanism is activated, the holding members will essentially remain in their open or locked position. If the holding members are thus in their locking position they cannot be unlocked until the blocking mechanism is deactivated. This prevents the raising device from sudden failure of the locking function of the holding members, for instance due to weather conditions or other negative impacts on the tower in a raised position. Thus, the blocking mechanism is a means of how to effectively prevent the tower from uncontrolledly falling down while being raised by means of the raising device.

In particular, such blocking mechanism can comprise a pin which engages with a recess of a movable element of the raising device (i.e. in particular of the movement mechanism) which movable element is connected to at least one of, or all of the holding members in order to block a movement of that/the holding member(s). The pin can easily be inserted manually into the recess once the holding member(s) has/have reached a desired position. The same way, the pin can be extracted from the recess once a different position (and thus a change of position) of the holding member(s) is desired.

The raising device may also comprise a cover realized to cover an open part of the tower, i.e. an upper opening of the tower facing upwards when the tower is positioned in the designated position of assembly in which a nacelle can be placed on the top of the tower. Such cover can serve to shield the inside of the tower from influences from above, in particular rain or snow. The cover can be loosely connected to the raising device, for instance when the cover is installed on the tower. In such case, the cover can be installed on the tower first and then the raising device can be connected to both the tower and the cover. Alternatively, the cover and the raising device can be assembled (i.e. interconnected) and then connected to the tower together.

In this context, the cover comprises at least one opening realized as a service opening for staff and/or as a through-hole for at least one of the holding members. A service opening, for instance a hatch which can be closed by a cover when no staff wants to pass can permit staff from the inner side of the tower to the outside on top of the tower (or reverse), for instance in order to permit assembly work in these locations. A through-hole is sized such that it permits the passage of the corresponding holding member. It may be sized and realized such that it is essentially in contact with the holding member (or a connection of the holding member to other parts of the raising device) so that essentially no rain or snow can pass through the through-hole. It may also be sized slightly larger to permit easier passage of the holding member (or a connection of the holding member to other parts of the raising device).

BRIEF DESCRIPTION

Some of the embodiments will be described in detail, with reference to the following figures, wherein like designations denote like members, wherein.

DETAILED DESCRIPTION

Figure 1:
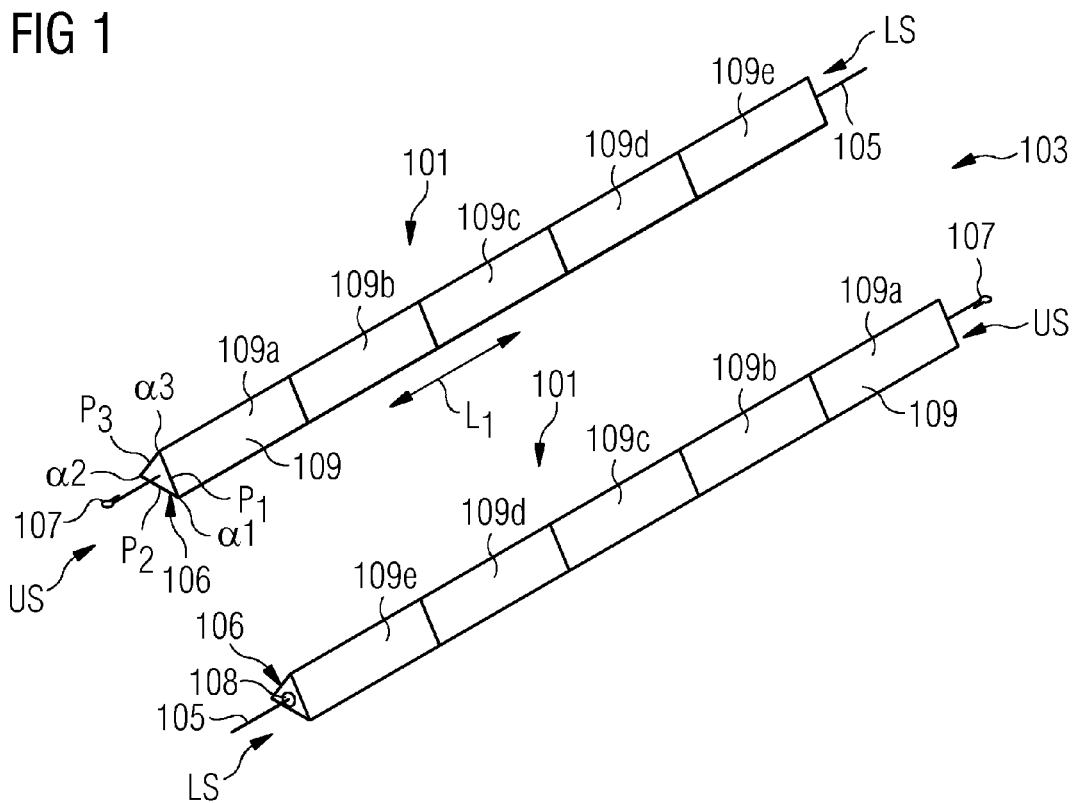
FIG. 1 shows a perspective view of a strake set according to an embodiment.

FIG. 1 shows an embodiment of a strake set 103 according to the invention. It comprises three detachable strakes 101, two of which are shown here. All detachable strakes 101 are of the same make, i.e. identical. Each of the detachable strakes comprises a rope 105 of an ultra-high molecular weight polyethylene fibre material. The ropes 105 are both encompassed along parts of their longitudinal extensions $L_1$ by a covering structure 109. The ropes 105 project from the covering structure 109 at either side of the longitudinal extensions $L_1$ reaching from an upper end US to a lower end LS. In a designated position (cf. FIGS. 2 and 3) the strakes 101 are connected to the tower of a wind turbine such that the upper end US faces essentially vertically upwards and the lower end LS faces essentially vertically downwards when to wind turbine tower is positioned in an upright position.

At either longitudinal ends US, LS the covering structures 109 are equipped with an end piece 106 through which the ropes 105 are led via openings in the end piece 106. At the lower ends LS there is also attached a (circular) end stop 108, here a metal end stop, with a diameter of 100 mm and a thickness of 10 mm, which end stop 108 prevents the covering structures 109 from uncontrolledly slipping down along the ropes 105 when the detachable strake 101 is suspended.

The shape of the end pieces 106 represents the cross-sectional shapes S of the covering structures 109 all along the longitudinal extensions $L_1$. They are triangular shapes S defined by three planes $P_1$, $P_2$, $P_3$ (represented here by lines $P_1$, $P_2$, $P_3$) which are interconnected via three angles $\alpha_1$, $\alpha_2$, $\alpha_3$. Thereby the planes $P_1$, $P_2$, $P_3$ have the same extension, namely 300 mms, and the three angles $\alpha_1$, $\alpha_2$, $\alpha_3$ all have the same value, namely 60°. The triangular shape S thus constitutes an equal-sided triangle.

Each of the covering structures 109 comprises five structure sections 109a, 109b, 109c, 109d, 109e having a longitudinal extension each of 1020 mm. More structure sections may be added if necessary to increase the length of coverage of the ropes 105, for instance if the strakes 101 are to be attached to higher towers.

The structure sections 109a, 109b, 109c, 109d, 109e are assembled adjacent to each other but may also be separated from each other, for instance to extend the overall extension of the covering structure over a wider area of the rope 105. The division of the covering structure 109 into structure sections 109a, 109b, 109c, 109d, 109e makes it easier to transport and store the strakes 101 when they are detached from a wind turbine tower. The structure sections 109a, 109b, 109c, 109d, 109e and thus the covering structure 109 are comprised of flexible film material comprising polystyrene.

Figure 2:
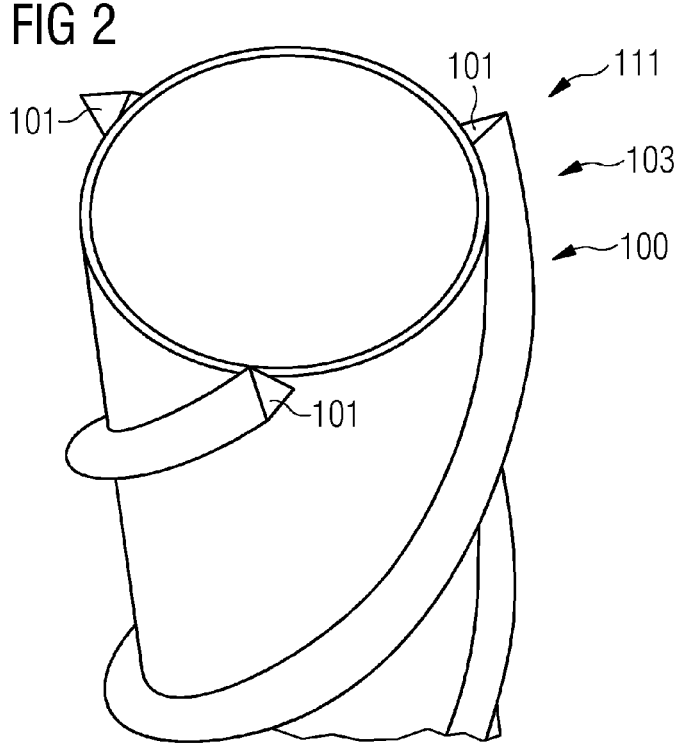
FIG. 2 shows a perspective view of a wind turbine tower according to an embodiment.
Figure 3:
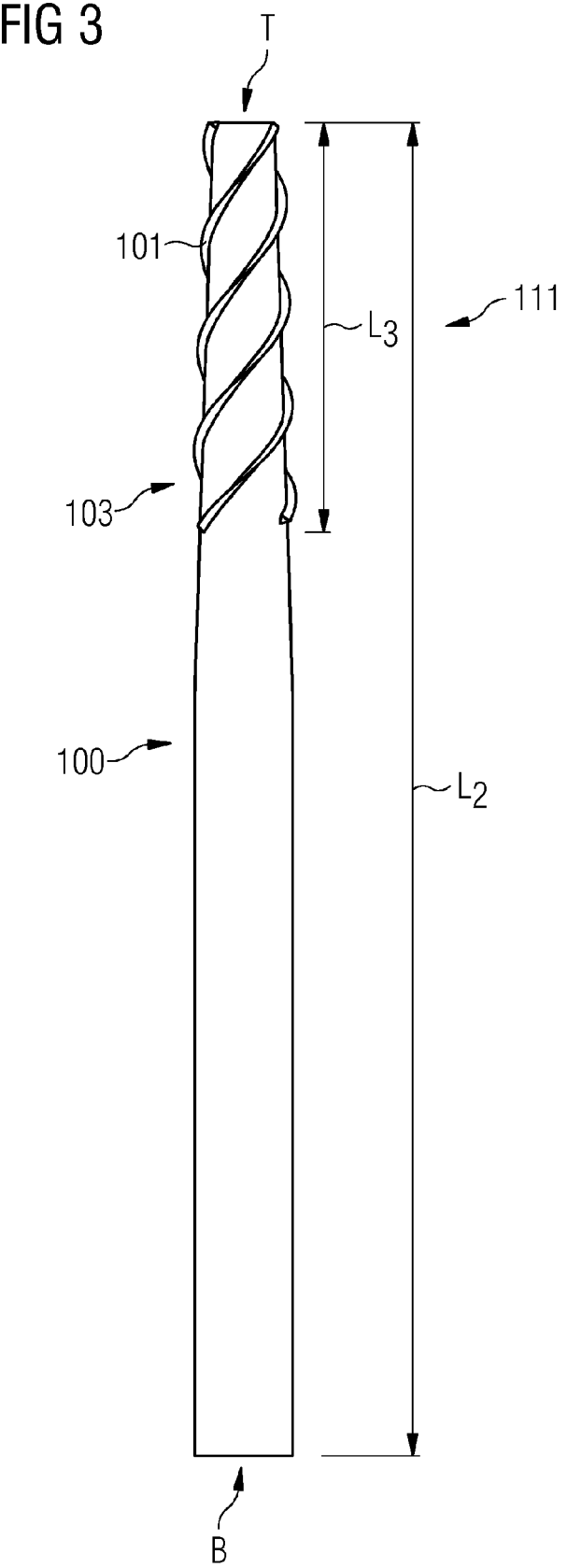
FIG. 3 shows a side view of the same wind turbine tower as in FIG. 2.

At the upper ends US of the ropes 105 there are connected detachable connection interfaces 107 realized as thimbles 107 of the ropes 105. By these connection interfaces 107 the strakes 101 can be connected to a top of a tower of a wind turbine Such tower 111 of a wind turbine 100 is shown in FIGS. 2 and 3. The three strakes 101 (all of which are shown in these two depictions) of the strake set 103 are detachably connected to the top T of the tower 111, from where the go along the outer surface of the tower 111 towards the bottom B of the tower 111. FIG. 3 shows the overall longitudinal extension $L_2$ of the tower 111 from the top T to the bottom B. At the top T a nacelle (not shown) of the wind turbine 100 can be attached when the tower 111 is installed at its bottom B on a designated foundation (not shown). The covering structures 109 of the strakes 101 only reach downwards at a length $L_3$ of the tower 111, namely along about a third of its total longitudinal extension $L_2$. The ropes 105 (not depicted in FIGS. 2 and 3) extend further down to the bottom B of the tower 111 where they are affixed to the tower 111 at its outside surface.

The strakes are assembled around the circumference of the tower 111 equidistantly, i.e. at the same angles of 120° from each other with reference to the tubular cross-section of the tower 111. They wind around the outer surface of the tower 111 in a helical shape so as to catch the wind, in particular in the upper region of the tower 111 where the covering structures 109 of the strakes 101 catch the wind to lead it further away from the tower 111 and thus to avoid vortex induced vibrations.

In this exemplary embodiment, the tower 111 has a diameter of 3000 mm at its top T. The pitch of the helical shape (i.e. the helicity) of the strakes 101 is five times that diameter. The strakes 101 project from the outer surface of the tower 111 about 260 mm, i.e. essentially about 10% of the diameter of the tower 111.

Figure 4:
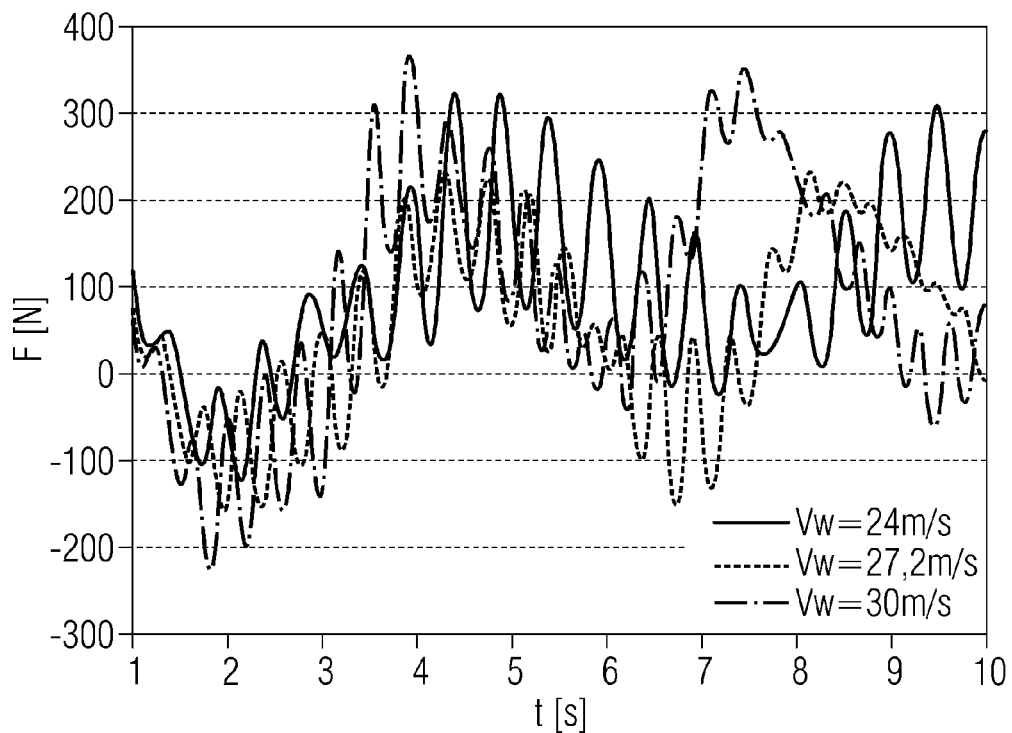
FIG. 4 shows a diagram of calculated lift forces on a tower according to the state of the art under different wind speed conditions.
Figure 5:
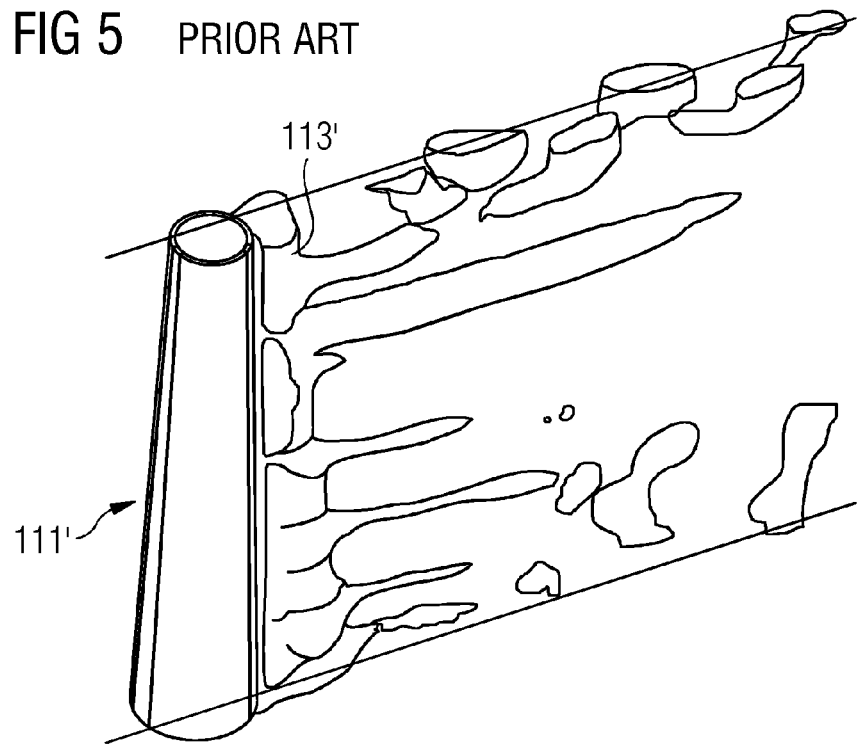
FIG. 5 shows a simulation result of vortex shedding behaviour of the same tower as referred to in FIG. 4.
Figure 6:
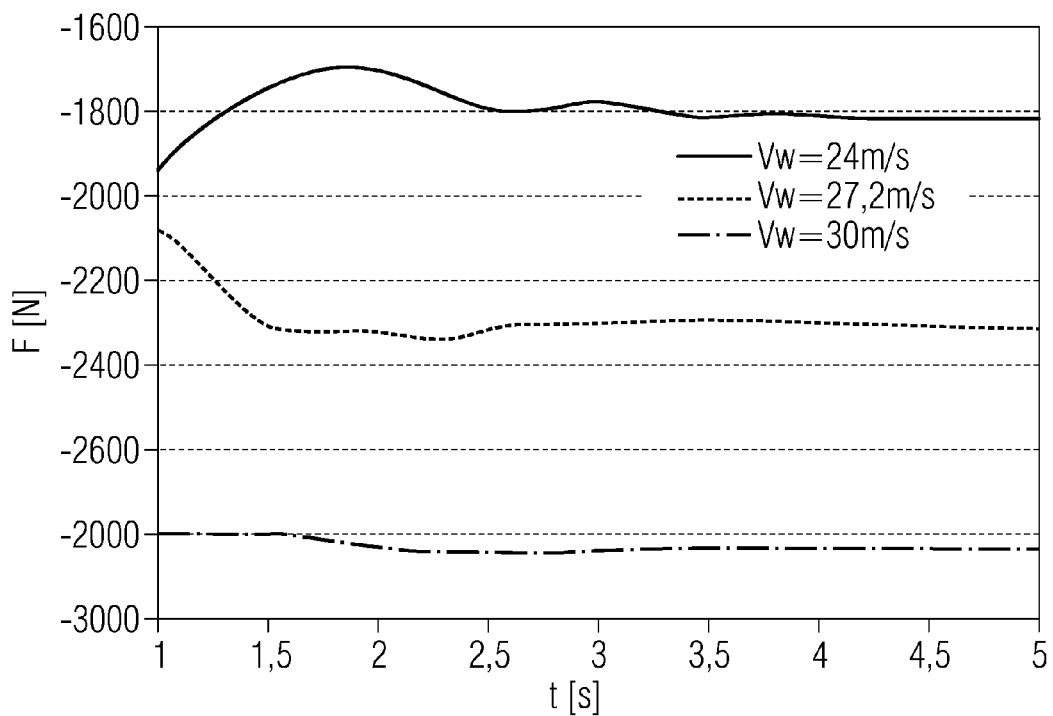
FIG. 6 shows a diagram of calculated lift forces on a tower according to an embodiment of the invention under the same wind speed conditions as referred to in FIG. 4.
Figure 7:
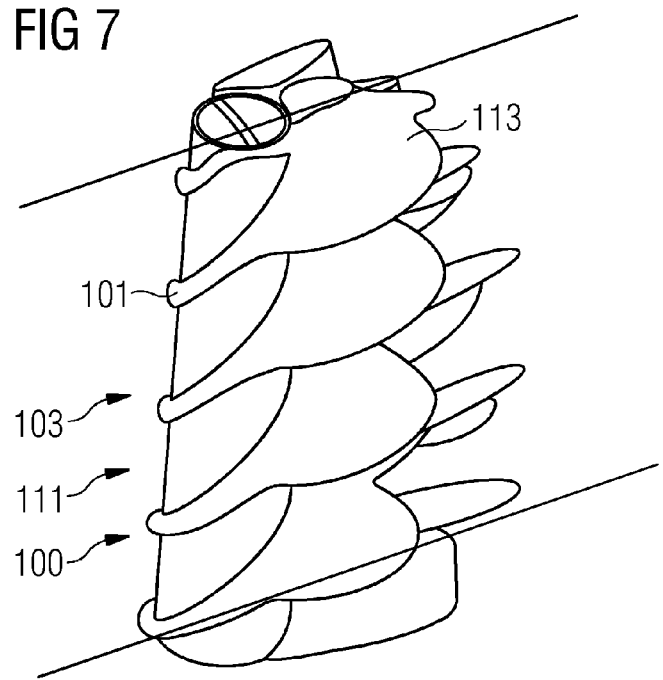
FIG. 7 shows a simulation result of vortex shedding behaviour of the same tower as referred to in FIG. 6.

FIGS. 4 to 7 can serve to explain the effect of such strakes 101. FIGS. 4 and 5 show representative simulation results of the forces and airflow on a prior art tower 111' of a wind turbine. FIGS. 6 and 7 in contrast show representative simulation results of the forces and airflow on a tower 111 of a wind turbine equipped with a strake set 103 according to an embodiment of the invention.

FIGS. 4 and 6 show diagrams of calculated (i.e. simulated) lift forces F on the towers 111', 111 over a time t under different wind speed conditions Vw, namely winds coming from a defined side at speeds of 24 m/s, 27.2 m/s and 30 m/s. It can be observed that these lift forces F vary enormously in FIG. 4, i.e. show strong oscillations, whereas the lift forces F are all nearly constant in FIG. 6. Oscillations in lift forces F induce vibrations, namely vortex induced vibrations.

This can be explained when referring to FIGS. 5 and 7 depicting the vortex shedding 113', 113 of a prior art tower 111' (FIG. 5) in comparison with that of a tower 111 according to an embodiment of the invention (FIG. 7). The first vortex shedding (FIG. 5) is firstly substantially longer than the second one (FIG. 7) and also much narrower, situated right at the back of the tower 111' (seen from the wind direction) so that the lift forces F have a much stronger impact on the tower 111' than on the tower 111 where they are wider due to the strakes 101 of the strake set 103. The strakes 101 have the effect of leading a substantial part of the wind to the side of the tower 111 (seen from the wind direction) rather than directly behind it. This is irrespective of where the wind comes from as the strakes 101 are aligned around the tower 111 to essentially form the same surface of the tower 111 combined with the strakes 101.

FIGS. 8 to 14 show explanatory depictions of a raising device which can be used together with a strake set according to the invention to form a transport assembly according to an embodiment of the invention.

Figure 8:
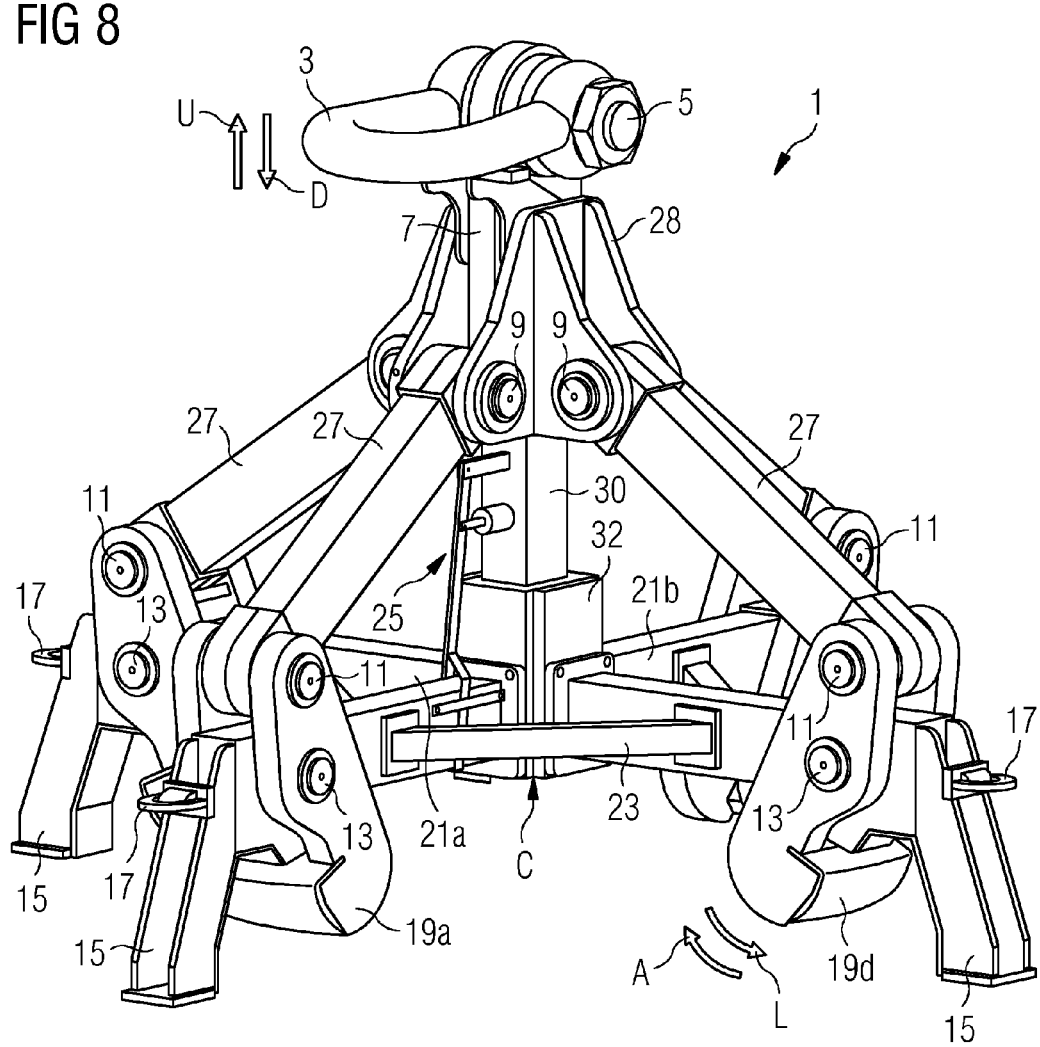
FIG. 8 shows a perspective view of a raising device according to a preferred embodiment.

FIG. 8 shows a raising device 1 for raising a tower section (not shown) of a wind turbine. The raising device 1 comprises a connection member 3 realized as an eye 3 which is attached via a first hinge 5 to four connection shapes 28. To these connection shapes 28 there is each hingedly attached via a second hinge 9 a connection beam 27. The connection beams 27 are thus connected essentially at their first end via the second hinges 9 to the connection shapes 28 and at their second ends to third hinges 11 to holding members 19a, 19b, 19c, 19d (the two latter being obscured in the figure due to the perspective view) realized as claws 19a, 19b, 19c, 19d. The holding members 19a, 19b, 19c, 19d are realized as two pairs of corresponding holding members 19a, 19b, 19c, 19d, namely a first pair of corresponding holding members 19c, 19d is aligned along a first holding beam 21a and a second pair of corresponding holding members 19a, 19b is aligned along a second holding beam 21b.

The raising device 1 thus further comprises a first holding beam 21a and a second holding beam 21b which is a perpendicularly positioned cross-beam to the first holding beam 21a. These two holding beams 21a, 21b are directly interconnected at the centre C of the raising device 1 and indirectly by diagonal connections 23 at about the middle of the distance of each holding beam 21a, 21b from the centre C of the raising device 1 to the end of the respective holding beam 21a, 21b. At these ends of the holding beams 21a, 21b fourth hinges 13 are positioned which connect each of the holding beams with one of the claws 19a, 19b, 19c, 19d.

From the centre C of the raising device 1 at which the two holding beams 21a, 21b are interconnected directly, an upward-facing beam 30 is also connected to the two holding beams 21a, 21b (directly or indirectly). That beam 30 is hollow and essentially extends up to the connection shapes 28, but is not directly connected to these. Inside the hollow beam 30 there is positioned another guiding beam 7 which is connected to the connection shapes 28 and thus indirectly to the connection member 3.

At either end of each of the holding beams 21a, 21b there are positioned legs 15 extending downwards (i.e. away from the connection member 3) on which the raising device 1 can rest stably if stored on ground. In addition, at all of these mentioned ends of the holding beams 21a, 21b there is also an eye 17. The eyes 17 can be used to move and steer the raising device (and a tower connected to it) in a circle, i.e. to orientate the tower during a raising and transport processes and in particular during assembly of the tower at a designated operating site. Further, the raising device 1 comprises a blocking mechanism 25 the function and details of which will be explained with reference to FIGS. 11 and 12.

When the raising device 1 is raised by a raising machine such as a crane, it is connected to that raising machine via the connection member 3 which is thus raised in an upward direction U. Reversely, when the raising device 1 is lowered to the ground, it is lowered in a downward direction D until the connection member 3 goes downwards into the position shown in FIG. 8. At the same time, due to the movement mechanism of the raising device 1, the raising force while raising the raising device 1 in the upward direction is transferred via the four hinges 5, 9, 11, 13 into a moving force which tilts each of the holding members 19a, 19b, 19c, 19d in a locking direction L, i.e. out of the open position depicted in FIG. 8 into a locking position. Reversely, when no raising force is applied to the raising device 1 anymore, i.e. when the connection to the raising machine via the connection member 3 is released or lose, the weight of the upper parts of the raising device 1 is enough to move the holding members 19a, 19b, 19c, 19d from the locking position in an counter direction A to the locking direction L into the open position again. Additionally, this movement in the counter direction A may be supported by actors such as springs (not shown).

In essence, this construction permits an automatic tilting movement of the holding members 19a, 19b, 19c, and 19d in both the locking direction L and the counter direction A based on the force exerted on the connection member 3. No manual or motor support of that movement is necessary.

In this context, it can be stated that the term "movement mechanism" refers to all those movable parts of the raising device 1 which interconnect the connection member 3 with the holding members 19a, 19b, 19c, 19d serving to transfer the raising (and lowering) forces inflicted on the connection member 3 into forces for moving the holding members 19a, 19b, 19c, 19d into or out of the locking position, i.e. in the locking direction L or the counter direction A.

Figure 9:
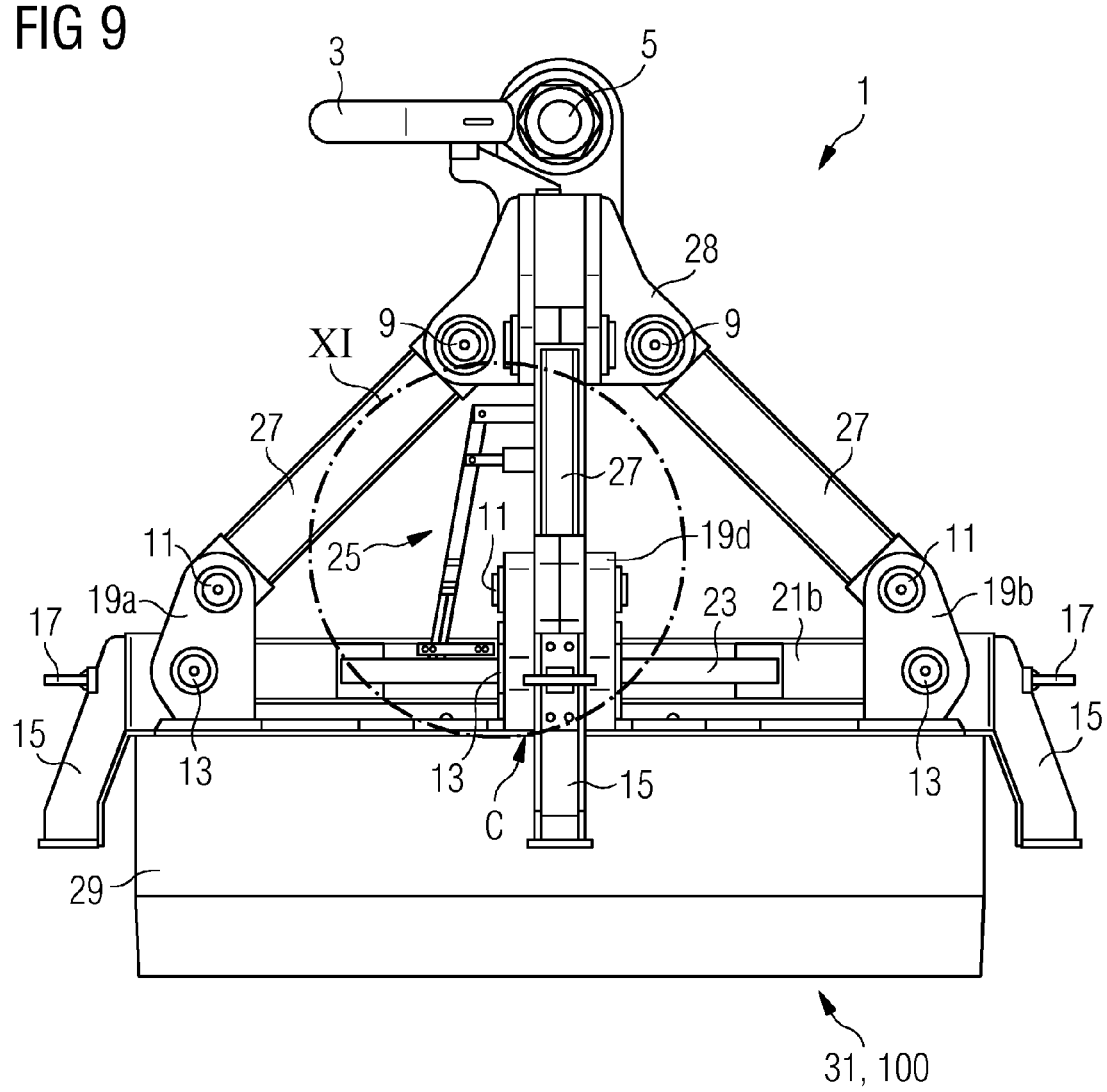
FIG. 9 shows a first side view of the same raising device placed on top of a tower in a locked position.

Referring now to FIG. 9, which is a first side view of the same raising device 1 installed on top of a tower 31 of a wind turbine 100. The raising device 1 is thereby in a locked position, i.e. the holding members 19a, 19b, 19c, 19d have been moved completely in the locking direction L. Therefore they engage with an inwards protruding part (not shown) of an inner flange 29 of the tower 31 which inner flange 29 is comprised of the top element of the tower 31 which can be seen in FIG. 9 and of the inwards protruding part which cannot be seen. As the holding members 19a, 19b, 19c, 19d are all orientated with their locking directions towards the inner surface of the tower 31, their lower part has been tilted below the inner flange 29 so that the holding members 19a, 19b, 19c, 19d facing into four directions and all orientated in a 90° angle to the next holding member hold the inwards protruding part of the inner flange 29 firmly from underneath. In this arrangement, the feet 15 are positioned outside of the tower 31.

Figure 10:
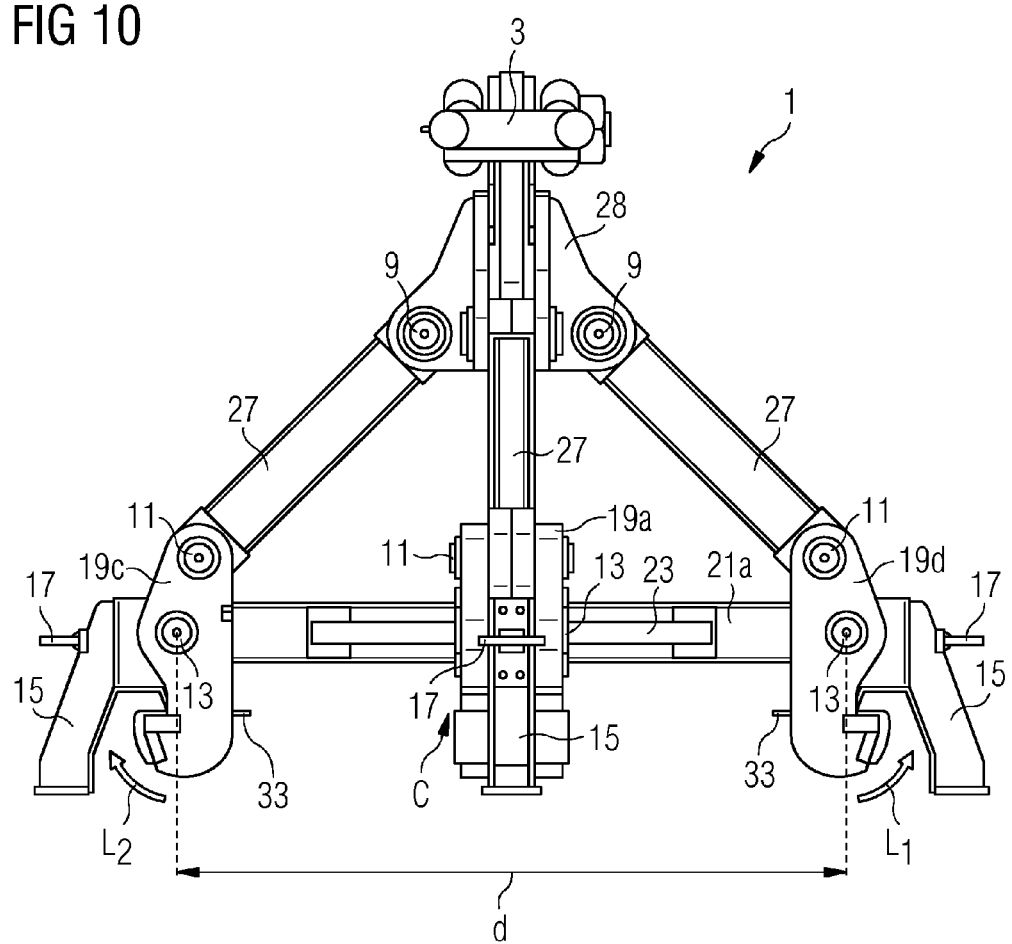
FIG. 10 shows a second side of the same raising device without the tower.

FIG. 10 shows the same raising device 1 in a second side view which is perpendicular to the side view of FIG. 9. It can be seen here that along the first holding beam 21a (and the same applies with respect to the second holding beam 21b and all the elements connected with it) the holding members 19a, 19b, 19c, 19d are positioned fixedly via their fourth hinges 13 to the first holding beam 21a along a predefined distance d. The locking direction $L_1$ of the holding member 19d at the right hand side is orientated away from the centre C of the raising device 1 further to the right whereas the locking direction $L_2$ of the holding member 19c at the left hand side faces exactly in the opposite direction.

Further, it can be seen in FIG. 10 that to each of the holding members 19a, 19b, 19c, 19d there is connected a connection eye 33 projecting towards the centre C of the raising device 1. These connection eyes 33 can be used to connect to a cover which will be explained with reference to FIGS. 13 and 14.

Figure 11:
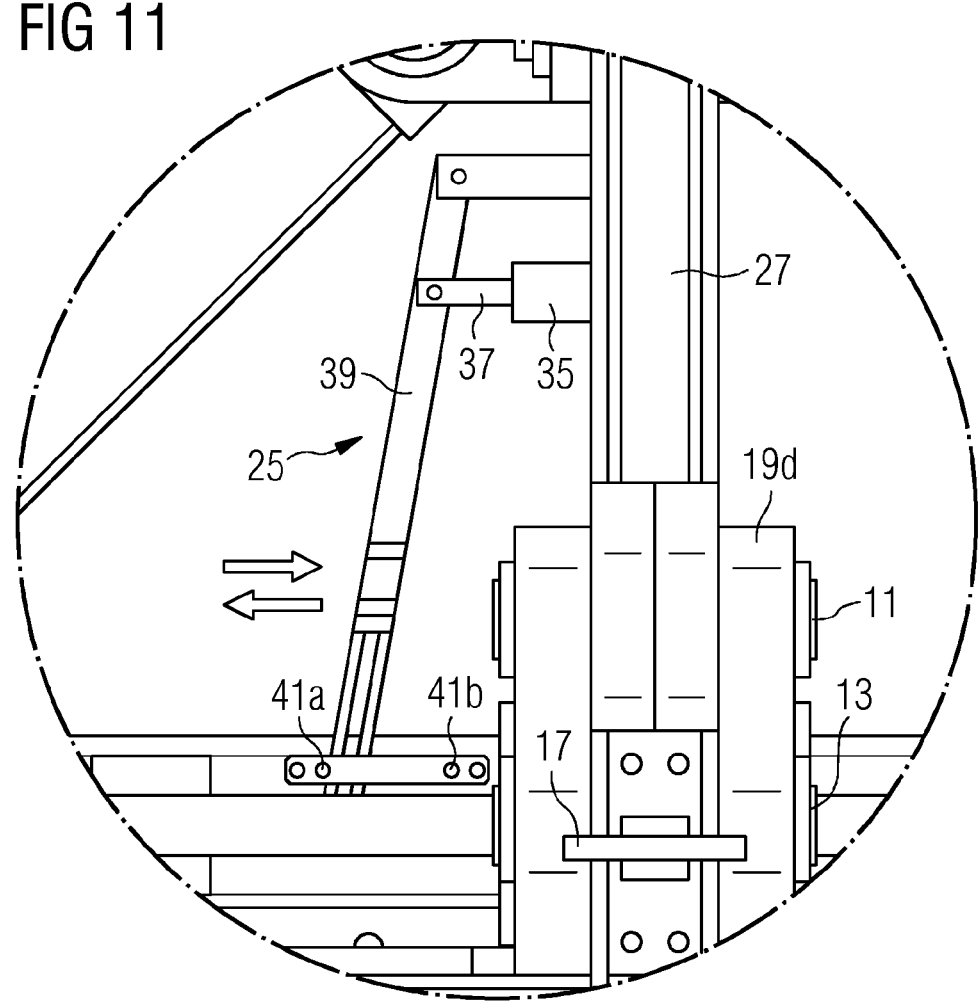
FIG. 11 shows a detailed view of a detail from FIG. 9.
Figure 12:
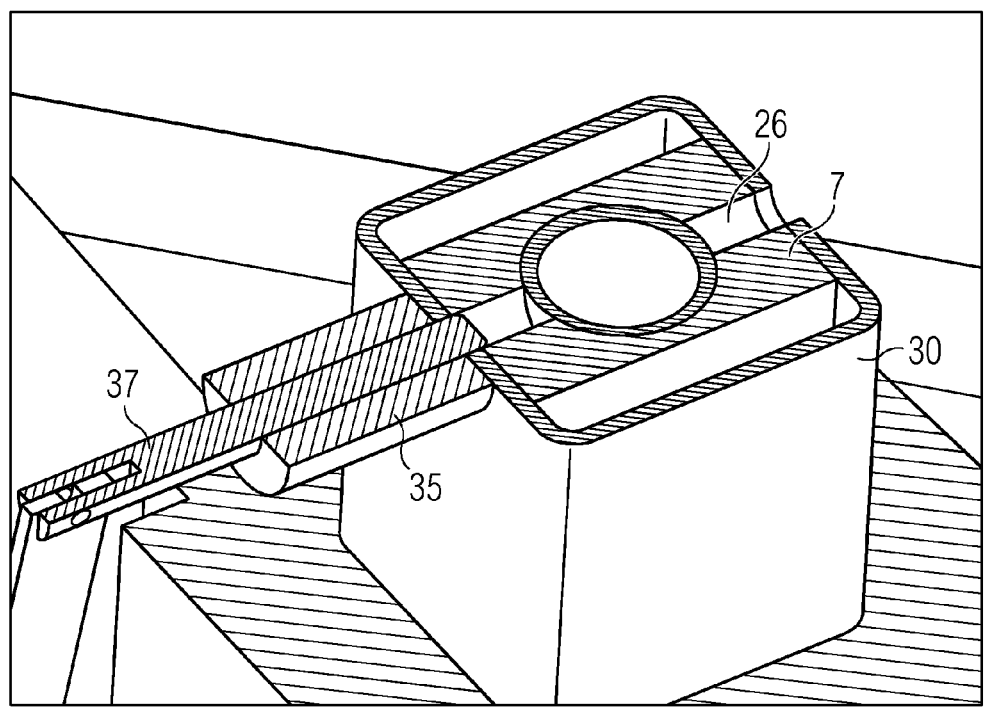
FIG. 12 shows perspective sectional view of a further detail of the same raising device.

FIGS. 11 and 12 serve to explain the blocking mechanism 25 in more detail. The blocking mechanism 25 comprises an inlet shell 35 for a pin 37 through which the pin 37 can be led inside the beam 30 (obscured in this figure due to the perspective). A handle 39 is connected to the pin 37 in order to facilitate manual (or motor-driven) movement of the pin 37 into the beam 30 and out again. At the lower end of the handle 39 two catch bolts 41a, 41b are positioned which are realized to firmly hold the handle 39 in a desired first, open, position (corresponding to the left catch bolt 41a) and in a desired second, blocked, position (corresponding to the right catch bolt 41*b*). Thus, the catch bolts 41*a*, 41*b* serve to fix the handle 39 in one of these two positions to prevent it from moving undesiredly.

FIG. 12 shows a section view of the beam 30 with its inner guiding beam 7. In order for the pin 37 to block the movement of the movement mechanism, the guiding beam 7 comprises two recesses 26 along its longitudinal extension (i.e. the upward direction U and the downward direction D) one of which is depicted in FIG. 12. At two given predefined positions of the guiding beam 7 corresponding with the locking position and the open position of the holding members 19*a*, 19*b*, 19*c*, 19*d* the pin 37 can thus be inserted into the recesses 26 of the guiding beam 7 thus blocking the guiding beam 7 in its position and further blocking any movement of the movement mechanism.

Figure 13:
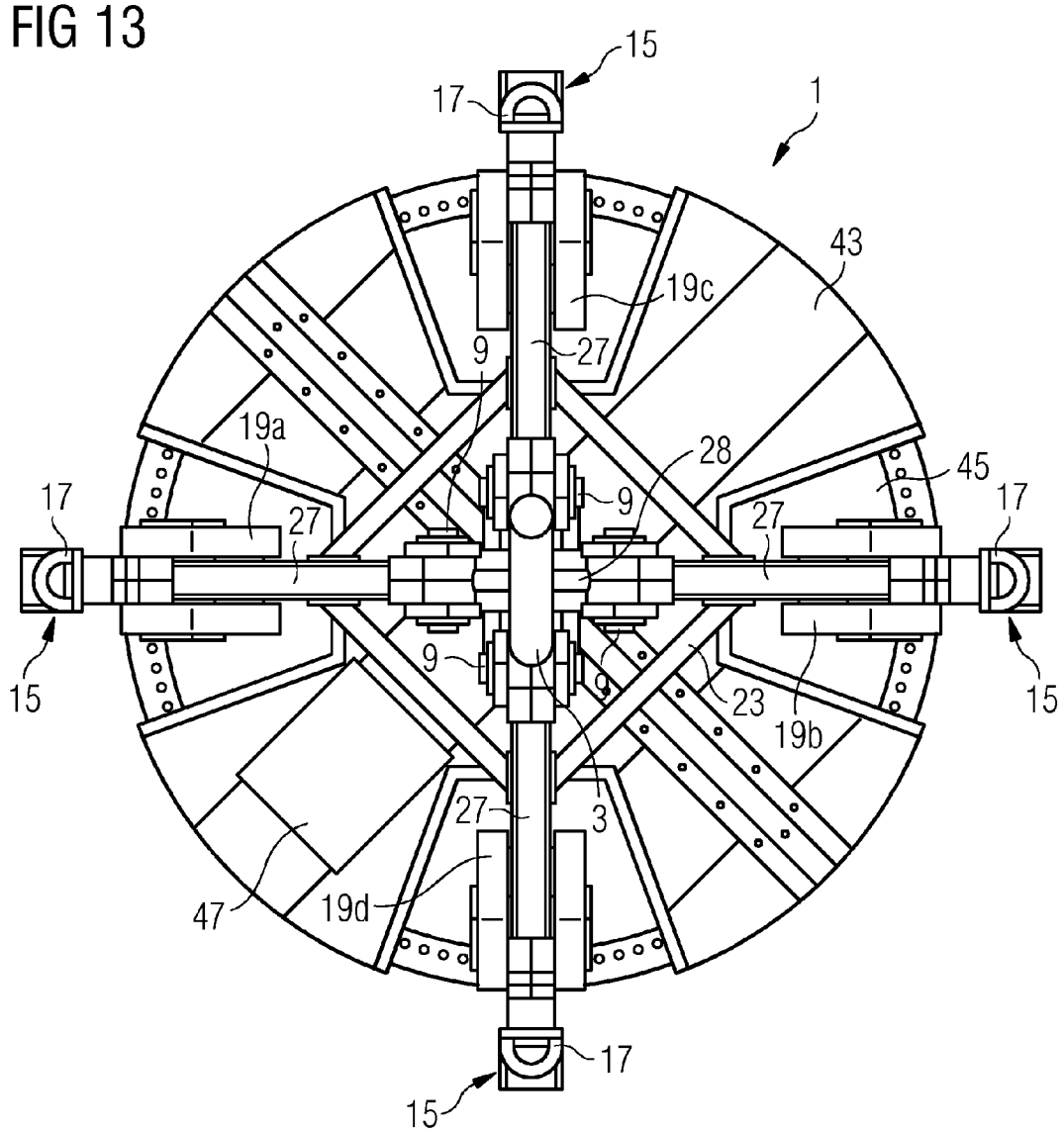
FIG. 13 shows a top view of the same raising device equipped with a cover.
Figure 14:
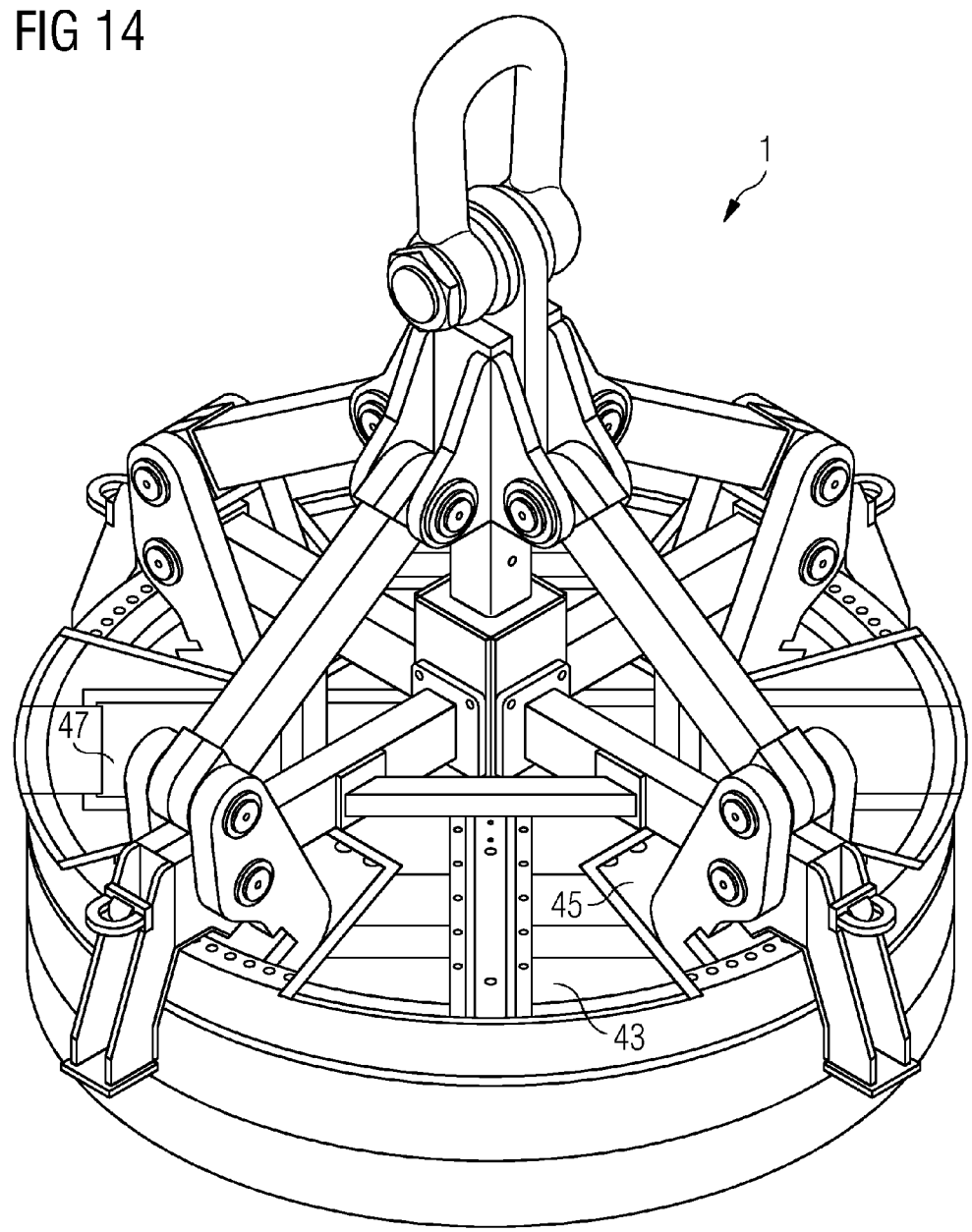
FIG. 14 shows a perspective view of the same raising device with the cover placed on top of a tower.

Turning to FIGS. 13 and 14, this shows the same raising device 1 which is further equipped with a cover 43. The cover 43 is connected to the raising device via 1 the connection eyes 33 (cf. FIG. 10) and serves to shield the inner side of the tower 31 from the ambient environment, in particular from rain or snow. The cover 43 comprises a first opening 47 realized as a service hatch 47 through which staff can climb in order to get from the inside of the tower 31 to the upper side of the cover 43 or reverse. Moreover, the cover 43 comprises four through-openings 45 through which the holding members 19*a*, 19*b*, 19*c*, 19*d* are inserted.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method of transporting a tower of a wind turbine in an upright position to an assembly site of the wind turbine comprising:
   equipping the tower with a strake set comprising a number of strakes positioned to lead from a top of the tower in the upright position down towards a bottom of the tower, at least one of the strakes being an independently adjustable strake, and at least one of the strakes being independently detachable and having a helicity which is adjustable when the strake is attached to the tower of a wind turbine at at least one point; and transporting the tower in the upright position.

2. The method according to claim 1, wherein the number of strakes is at least two.

3. The method according to claim 1, wherein the strakes are aligned along the circumference of the tower at essentially equal angles.

4. A transport assembly for transporting a tower of a wind turbine in an upright position to an assembly site of the wind turbine, comprising:
   a mechanical raising device configured to be connected to the top end of the tower when the tower is in an upright position such that the mechanical raising device is positioned substantially over a top cross section of the tower; and
   a strake set attached to the external surface of the tower and running helically down the tower, the strake set comprising a number of strakes, wherein at least one of the strakes is an independently adjustable strake, and at least one of the strakes is an independently detachable strake having a helicity which is adjustable when the strake is attached to the tower of a wind turbine at at least one point.

* * * * *